Patented July 24, 1951

2,561,862

UNITED STATES PATENT OFFICE 2,561,862

CALCIUM PRODUCT

Eugene F. Hill, Detroit, Mich., assignor to Ethyl Corporation, New York, N. Y., a corporation of Delaware No Drawing. Original application April 1, 1949, Serial No. 85,051. Divided and this application March 25, 1950, Serial No. 152,009

2 Claims. (Cl. 75—0.5)

This application is a division of my application, Serial No. 85,051, filed April 1, 1949, now Patent Serial No. 2,543,406. This invention relates to a new crystalline calcium product.

In the production of sodium by electrolysis of fused sodium chloride, calcium chloride is added to the electrolyte in order to lower its melting point. During the electrolysis calcium metal, as well as sodium, is produced at the cathode, and at the temperature of operation dissolves in the sodium melt. When this solution is removed from the cell it is cooled and most of the calcium crystallizes out. This crude sodium mixture containing the calcium metal is purified, usually by mechanical separation, and most of the sodium recovered therefrom. The residue or sludge obtained from such separation consists of a mixture of solids containing crystals of calcium embedded in a matrix of sodium and it also contains impurities such as sodium and calcium oxides and chlorides. The total amount of metals in the residue varies but in general it is from 90 to 95 per cent. The amount of calcium contained therein is generally between 15 and 30 per cent.

Certain workers in this field have attempted to recover some of the sodium component from this sludge. However, this is impractical and commercial practice has been to dispose of this sludge, by any safe means. One such means is to return the sludge to the electrolytic cells, but this procedure is uneconomical and hazardous. Also such residues can be disposed of by burning or by chemical means. These methods, however, destroy the metal components since the resulting mixture of oxides and salts has no commercial value and must be wasted. None of the disposal methods are economical and all are hazardous due to the danger of fire and explosion if the sludge is contacted with water. Processes that have recovered sodium have not paid for the cost of the processing and were used primarily as a preferred means of disposal. The calcium values as well as the sodium values contained in such sludges are important. Heretofore there has been no process for recovering the calcium values substantially free of alkali metal.

An object of my invention is to obtain a new calcium metal product in such finely divided form that it is especially suitable for use in commercial processes such as metal reduction, polymerizations, and for the production of calcium hydride.

I accomplish this object by treating a mixture of crystalline calcium metal and an alkali metal with an organic solvent which reacts with the alkali metal and dissolves the reaction product, following which I separate the undissolved calcium metal from the resulting solution before it has had an opportunity to react therewith in noticeable amounts.

In general there are two types of organic solvents reactive with an alkali metal which can be used in my process. One type forms addition products with the alkali metal and the other forms substitution products therewith. Examples of organic solvents forming addition products are naphthalene, diphenyl, and anthracene. The organic solvents reactive with an alkali metal by substitution are those compounds having a hydrogen atom replaceable by an alkali metal. Compounds of this type include hydroxy hydrocarbons, certain amines such as methyl amine and ethylene diamine, weak organic acids such as aryl sulphonic acids and lauric acid, acetylene, and mercaptans such as thiophenol.

In general the organic solvents employed in my invention are those which react more rapidly with an alkali metal than with the calcium metal, thus permitting separation of the alkaline earth metal from the system before it is consumed. As mentioned above, the organic solvent should form a reaction product with the alkali metal and should dissolve this product in order for high recoveries of a relatively pure alkaline earth metal to be obtained.

For the above reasons I prefer to use as my organic solvent hydroxy hydrocarbons, particularly monohydroxy hydrocarbons. Also the use of alcohols is preferred since the sodium alcoholates so formed can be readily recovered by removing excess alcohol. Such alcoholates are of considerable commercial value. Within the term monohydroxy hydrocarbons, I include alkyl, aryl aralkyl, alkylene and cyclic alcohols having only one hydroxy group. Polyhydroxy hydrocarbons such as glycol and glycerine generally do not give as good results as the above monohydroxy hydrocarbons. When dihydroxy hydrocarbons are used such as glycol, relatively low temperatures should be employed for best results. As examples of monohydroxy hydrocarbons, methyl, ethyl, propyl, isopropyl butyl and allyl alcohol as well as phenol and cresol have been successfully employed in my process.

My process is applicable to the separtion of crystalline calcium from different mixtures in which they occur with alkali metals. Referring specifically to the sodium-calcium sludge mixtures, a new form of highly reactive calcium of purity between 80 to 95 per cent and higher has been recovered in amounts of 80 to 90 per cent of the calcium contained in the sludge.

In general the crystalline calcium produced in my process is in the form of flat platelets, the major diameter of which varies from approximately 1/8 of an inch to 1/300 of an inch or less My calcium product predominates in such a form and in such a particle size range. That is, more than 80 per cent of my calcium has this form and size.

The calcium available on the market is in the form of lumps or turnings, and in this form is not entirely suitable for direct use in such processes as metal reduction and polymerization. Consequently such calcium must be further treated by grinding and chipping or other similar treatment to produce a usable but somewhat unsatisfactory particle size. Such operations are hazardous and expensive and therefore are of little commercial interest. However the calcium produced by my process is obtained in a state of subdivision which is ideal for direct use in the abovementioned processes. Further, it can be readily converted by treatment with hydrogen to form calcium hydride which can be used directly in metal processes and as a drying agent, without further grinding.

The proportion of particle sizes within the above range can be varied in my process to suit particular needs by changing the rate of cooling of the solution of calcium in alkali metal after it is removed from the cell. That is, by slower cooling I can obtain a product which predominates in larger size particles or by more rapid cooling a preponderance of smaller particles may be obtained.

The temperature employed in my separation process, while not critical, is important. The operating temperature is varied according to the organic solvent employed and the residence time of the calcium metal in the reaction medium. In general the temperature should not be higher than the boiling point of the reaction mixture. Preferably, temperatures considerably lower than this are employed when high purity of the calcium recovered is desired. For example, when a calcium-sodium mixture is treated with methyl alcohol at temperatures below $-10°$ C., a high recovery of high purity calcium is obtained. When the same mixture is treated with ethyl or propyl alcohol somewhat higher temperatures of the order of $-10°$ C. to $+10°$ C. are preferably used. In general, when alcohols are used as the reaction medium the temperature should be maintained below $100°$ C. In all cases, the pressure at the temperature used should be such as to maintain the organic solvent in the liquid phase in order that the alkali metal derivative thereof will be soluble therein.

The residence time of the calcium metal in the reaction mixture is important. By residence time I mean the total time of contact of the alkaline earth metal with the reaction mixture. Calcium is reactive with the organic solvents employed herein, but at a much slower rate than the alkali metal. This rate frequently does not become appreciable until after the reaction between the alkali metal and the organic solvent has been completed. Thus according to my invention, the residence time is terminated after the time of the reaction of the alkali metal is completed, and before noticeable amounts of calcium metals have been reacted.

The organic solvent employed also affects the average reaction rates of the metals being separated. For example, the relative reaction rates of sodium and calcium in admixture vary with the molecular weight of the alcohol used. The higher the molecular weight of the alcohol the less active the calcium becomes relative to the sodium. Thus ethyl alcohol is preferred over methyl alcohol because of the low degree of activity of calcium in ethyl alcohol as compared to sodium. In the same manner, the lower the temperature the greater the difference between the reaction rates of the alkali metal and the calcium metal, which results in a higher recovery of the latter. Even under conditions in which the difference in the relative reaction rates is small, high recoveries of calcium are obtained if the calcium is removed from the system almost as rapidly as it is released.

When calcium in a mixture containing an alkali metal is first contacted with an organic solvent such as ethyl alcohol substantially no reaction of the alkaline earth metal occurs for a period of time. This time I call the induction period for the calcium. The induction period varies with the temperature employed, the organic solvent used, the type and proportion of metals contained in the mixture, the impurities contained in the mixture, and the ratio of the organic solvent to the metallic mixture. For any given set of variables including temperature, the induction period can be readily determined by a simple laboratory procedure as follows:

A sample of a mixture of metals such as a sodium-calcium mixture is added gradually to a reaction vessel, preferably glass, containing the organic solvent and equipped with suitable temperature control and measuring means. As the metallic mixture reacts hydrogen bubbles are evolved by reaction of the sodium with the organic solvent followed by a quiescent period during which the calcium falls to the bottom of the flask where it builds up in a layer. After a time, however, hydrogen bubbles start to appear above this layer of calcium, and it is vigorously stirred by this evolution of gas. The elapsed time required for the start of this vigorous evolution of hydrogen bubbles from the resulting layer of calcium on the bottom of the vessel is called the induction period. In this test, since initially the only source of hydrogen bubbles is the sample of sodium-calcium it is to be noted that the bubbles all arise from the vicinity of the sample due to reaction of the sodium. When the induction period of the calcium is ended, the liberated calcium starts to react, a froth of bubbles covers the entire surface of the reaction medium, and the calcium no longer rests quietly on the bottom of the vessel but is dispersed throughout the reaction medium by the vigor of the gas evolution.

For example, the induction period for calcium in a sodium-calcium sludge was tested as above in a reaction medium of ethyl alcohol which had been dried over calcium hydride and subsequently distilled into a dry flask. The temperature was maintained at $-10°$ C. and the induction period of the calcium was observed as over 175 minutes. Similarly at temperatures of $10°$ C. and $45°$ C. the induction period for calcium in a dried ethyl alcohol medium was 41 and 8 minutes respectively. In like manner the induction period of calcium in a sodium-calcium sludge in methyl alcohol at $-10°$ C., in propyl alcohol at $45°$ C., and in cresol at $45°$ C. was 16, 53, and over 175 minutes respectively.

Thus for any given temperature and reaction medium the induction period for the calcium can be determined and the maximum residence time can be controlled so that the induction period of the calcium is not exceeded. If the alkaline earth metal is removed from the reaction mass within the induction period good recoveries are obtained.

For example the induction period for calcium in a sodium-calcium sludge when treated with anhydrous ethyl alcohol at $10°$ C. is 41 minutes.

When such sludge was processed using anhydrous ethyl alcohol at 10° C. with varying residence times of 34, 39 and 72 minutes, calcium was recovered in amounts of 75, 82 and 42 per cent respectively based on the calcium in the mixture. When the residence time is increased over the induction period the yields are decreased until little if any calcium is recovered. For example, in the above type of test, when the residence time was about 6½ hours at a temperature of about 14° C. no calcium was recovered.

The small amount of calcium which can be recovered when it has remained in contact with the solution for a period of time longer than its induction period tends to be unstable and may burn spontaneously. Such instability renders it dangerous to handle and otherwise unsuitable for commercial utilization. In other words an inferior calcium product is obtained. Thus I have shown the importance of residence time to the amount of recovery of the calcium. High yields of high purity calcium are obtained when the residence time is less than the induction period of the calcium but greater than the reaction time for the sodium.

One preferred mode of operation of my invention is best described in connection with separating calcium from a calcium-sodium sludge in an ethyl alcohol reaction medium. The induction period for the chosen conditions of operation is first determined by the method previously described. In performing the separation, the sludge should be added at such a rate and in such a state of subdivision that substantially all the sodium will react with the alcohol before the induction period of the calcium which was liberated from the first portion of cludge has elapsed. By operating in this fashion the calcium will not be contaminated by pieces of unreacted sludge. The ethyl alcohol is charged to a reaction vessel provided with means of temperature measurement and with means for agitation. Suitable temperature control means, such as immersing the vessel in a constant temperature bath, are provided. Agitation is commenced and a stream of inert gas such as nitrogen may be continuously passed over the surface of the reaction medium if desired. The calcium-sodium sludge is added slowly to the vessel while maintaining the desired temperature. The reaction mass is then removed from the freed calcium and the freed calcium is first washed with fresh quantities of ethyl alcohol, then with hexane and the hexane then removed by evaporation with an inert gas such as nitrogen.

Unless otherwise stated the parts given herein are by weight and the yield is the per cent recovery by weight of the alkaline earth metal in the mixture.

Following the above procedure, 10 parts of a mixture containing 64.5% sodium, 24.5% calcium, 2% sodium chloride and 9% sodium and calcium oxides was added gradually to a reaction vessel containing 200 parts of anhydrous ethyl alcohol. The vessel was immersed in a constant temperature bath and the temperature was maintained at −10° C. for a residence time of 90 minutes, the induction period being over 175 minutes. The reaction mass was then removed from the reaction vessel and the settled calcium removed by filtration. The calcium produced was washed several times with fresh quantities of ethyl alcohol, then with hexane and the hexane removed by evaporation with nitrogen. The calcium was analyzed and a yield of 82% having 83.4% purity was obtained.

In a similar operation except that a temperature of +10° C. was maintained for a residence time of 34 minutes, the induction period being 41 minutes, a 75% yield of calcium having a purity of 80% was obtained. However, when the residence time at that temperature was doubled the yield of calcium as well as the purity decreased sharply.

In another operation, in adding 10 parts of the metal mixture to 200 parts of methyl alcohol and maintaining the temperature at 10° C. for a residence time of 15 minutes, the induction period being 16 minutes, an 83% yield of calcium having a 65.5% purity was obtained. Similarly by the use of propyl, n-butyl and allyl alcohols at temperatures of 45° C., 45° C., and 25° C. respectively, and a residence time of 14, 1020 and 125 minutes respectively, calcium yields of 97.5, 82 and 81% respectively, having a purity of 85.3, 91 and 70% respectively, were obtained.

Likewise when mixed cresols was used as the organic solvent, and when a temperature of 45° C. for a residence time of 180 minutes was employed, an 87.2% yield of calcium having a purity of 84% was obtained. Similarly when 19.1 parts of the same metal mixture was added gradually to 150 parts of biphenyl dissolved in 200 parts of dimethyl Cellosolve and a temperature of 25° C. maintained for a residence time of 1260 minutes, an 87.2% yield of calcium having a purity of 89% was obtained.

In another test conducted as above when 14.6 parts of the same metal mixture was added slowly to 68 parts of naphthalene while the temperature was maintained at 25° C. for a residence time of 300 minutes, a 67% yield of calcium having a 99% purity was obtained. In this test, the calcium recovery procedure was modified to some extent. At the end of the residence period the reaction mass was removed from the vessel and neutralized with cresol. The solid residue was then recovered by decantation and finally washed. The product was then dried, weighed and analyzed.

In all of the above examples the calcium product obtained was in the form of platelets, 80% of which had a major diameter in the size range of ⅛ inch to 1/300 inch. Also substantially all of the sodium was recovered as sodium alcoholate, or as sodium cresolate when cresol was used as a neutralizing medium in the biphenyl and naphthalene reactions.

Other modifications of my invention can be made. The above examples and modes of operation are not intended to limit my invention but are given to illustrate its nature.

I claim:

1. A stable, crystalline, elemental calcium product consisting essentially of at least 80% of platelets, the major diameters of which vary between ⅛ inch to 1/300 inch.

2. A stable, crystalline, elemental calcium product consisting essentially of calcium platelets, the major diameter of which is less than ⅛ inch.

EUGENE F. HILL.

REFERENCES CITED

The following references are of record in the file of this patent:

"Handbook of Nonferrous Metallurgy," by Liddell, second ed., vol. 2, published by McGraw-Hill Book Co., 1945, page 87.